United States Patent [19]

Durm et al.

[11] Patent Number: 4,854,635
[45] Date of Patent: Aug. 8, 1989

[54] DRIVE MECHANISM FOR AN AIR GUIDE ARRANGEMENT

[75] Inventors: Juergen Durm, Ditzingen; Constantin Brin, Stuttgart, both of Fed. Rep. of Germany

[73] Assignee: Dr. Ing. h.c.F. Porsche Aktiengesellschaft, Stuttgart, Fed. Rep. of Germany

[21] Appl. No.: 214,386

[22] Filed: Jul. 1, 1988

[30] Foreign Application Priority Data

Jul. 4, 1987 [DE] Fed. Rep. of Germany ....... 3722202

[51] Int. Cl.⁴ .............................................. B62D 37/02
[52] U.S. Cl. ............................... 296/180.5; 296/180.1; 74/89.18; 74/470
[58] Field of Search .................. 296/180.5, 180.1, 223, 296/217, 91; 74/89.18, 470; 49/82, 84, 349

[56] References Cited

U.S. PATENT DOCUMENTS 2,817,512 12/1957 Christen ................................. 49/349
3,088,727 5/1963 Pelagatti ............................. 74/89.18

FOREIGN PATENT DOCUMENTS 67676 4/1986 Japan ................................. 296/180.1

Primary Examiner—Robert B. Reeves
Assistant Examiner—Brian Sells
Attorney, Agent, or Firm—Barnes & Thornburg

[57] ABSTRACT

A drive mechanism for the moving of an air guide arrangement provided at a motor vehicle from a retracted rest position into an extended operating position and vice versa which includes a toothed segment rotatably supported about an axis that is operatively connected with an adjusting lever of the air guide arrangement. In order to be able to compensate for error sources in the drive mechanism such as over-travel of the electric motor or out-of-adjustment limit switches, the toothed segment and the adjusting lever are supported separate from one another on the axis and are held in a predetermined position relative to one another by way of a spring element disposed therebetween. An entrainment member formed-on at the toothed segment further cooperates with a slot opening in the adjusting lever in such a manner that during the extension of the air guide arrangement into the operating position a rigid force transmission takes place between the toothed segment and the adjusting lever whereas during the end phase of the closing operation of the air guide arrangement, a defined elasticity is present in the force transmission.

20 Claims, 4 Drawing Sheets

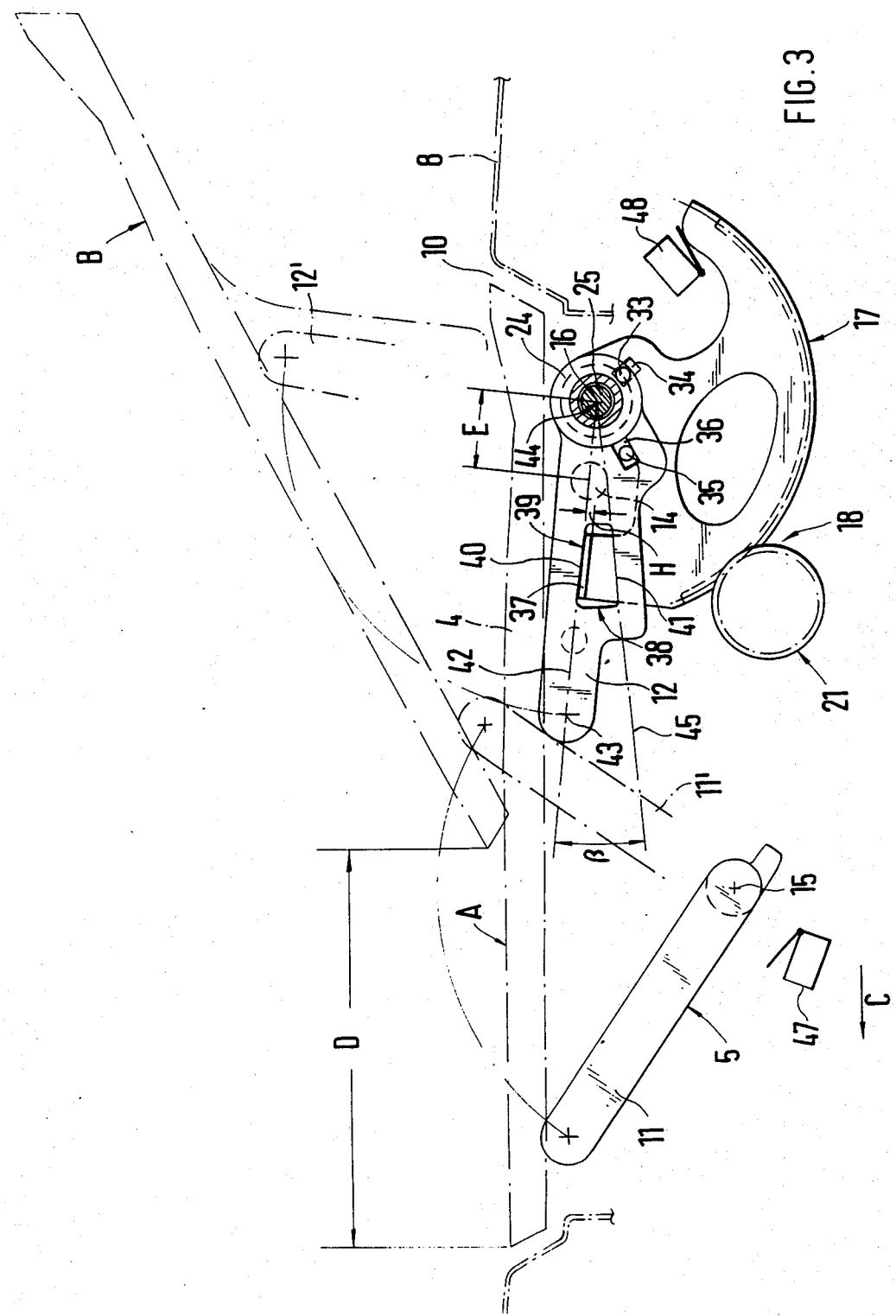

DRIVE MECHANISM FOR AN AIR GUIDE ARRANGEMENT

BACKGROUND AND SUMMARY OF THE INVENTION

The present invention relates to a drive mechanism for moving an air guide arrangement provided in a motor vehicle from a retracted rest position into an extended operating position and vice versa, whereby the drive mechanism includes a toothed segment rotatably supported about a shaft which is operatively connected with an adjusting lever of the air guide arrangement.

A drive mechanism of the aforementioned type is described in the (not-yet-published) German Pat. application No. P 36 15 84.5. In this drive mechanism, the toothed segment is constructed in one piece with the adjusting lever, as a result of which a rigid through-drive from the transmission pinion by way of the toothed segment to the adjusting lever of the air guide arrangement takes place both during the retracting operation as also during the extending operation of the air guide arrangement. This arrangement entails the disadvantage that the over-travel of the electric motor of the drive mechanism strongly varies with the temperature (summer/winter) and additionally is different from vehicle to vehicle. As a result thereof, the drive system is more or less stressed when the air guide arrangement runs up against the abutments on the side of the body which under certain circumstances can lead to breakage of the flexible shafts of the drive mechanism.

In order to be able to compensate occurring tolerances between the air guide arrangement and the adjoining body, the abutments must be constructed adjustable in this arrangement which considerably increases the installation expenditure. Furthermore, the motor is stopped abruptly if the electrical limit switches for the motor are out of adjustment owing to installation errors.

It is the object of the present invention to undertake in a drive mechanism for an adjustable air guide arrangement such measures that error sources conditioned on installation or manufacture such as over-travel of the electric motor or limit switches which are out of adjustment can be compensated.

The underlying problems are solved according to the present invention in that the toothed segment and the adjusting lever are supported on the shaft independently of one another and are held in a predetermined position relative to one another by a spring element disposed therebetween, and in that an entrainment member of the toothed segment so cooperates with a slot opening of the adjusting lever that during the extension of the air guide arrangement into the operating position, a rigid force transmission takes place between the toothed segment and the adjusting lever whereas in the end phase of the closing operation of the air guide arrangement, the entrainment member is decoupled from an upper boundary edge of the slot opening and is displaced toward a lower boundary edge of the slot opening by overcoming the spring tension of the spring element.

The advantages principally achieved with the present invention reside in that during the end phase of the closing operation of the air guide arrangement, the occurring error sources conditioned on installation and manufacture (motor over-travel, incorrect adjustment of limit switches, etc.) can be compensated at the place of the decoupling by the decoupled arrangement of the toothed segment and the adjusting lever as well as by the spring element.

During the closing movement of the air guide arrangement, the toothed segment is decoupled by way of the slot opening from an upper boundary edge in the direction toward a lower boundary edge as soon as the air guide arrangement contacts the abutments on the body side but the motor has not yet been de-energized (out of adjustment limit switches) or over-travels. No abrupt stopping of the motor thus takes place any longer and the stress forces of the flexible shafts are considerably smaller owing to the larger travel which the system now can undertake. The stressing is absorbed by the spring element. During the extension of the air guide arrangement, the drive system has the full torque of the motor available in order to move, for example, a frozen-in air guide arrangement into its extended operating position. This is achieved in that the entrainment member of the toothed segment abuts directly at the upper boundary of the slot opening. The defined elasticity in the force transmission can be varied during the closing operation by the angle $\beta$ of the slot opening in the adjusting lever, respectively, by the spring design. A rattling of the air guide arrangement in the rest position is prevented in that the air guide arrangement abuts under prestress at the abutments on the body side.

BRIEF DESCRIPTION OF THE DRAWINGS

These and other objects, features and advantages of the Present invention will become more apparent from the following description when taken in connection with the accompanying drawing which shows, for purposes of illustration only, one embodiment in accordance with the present invention, and wherein:

FIG. 3 is a cross-sectional view taken along line III—III of FIG. 2;

DETAILED DESCRIPTION OF THE DRAWINGS

Figure 1:
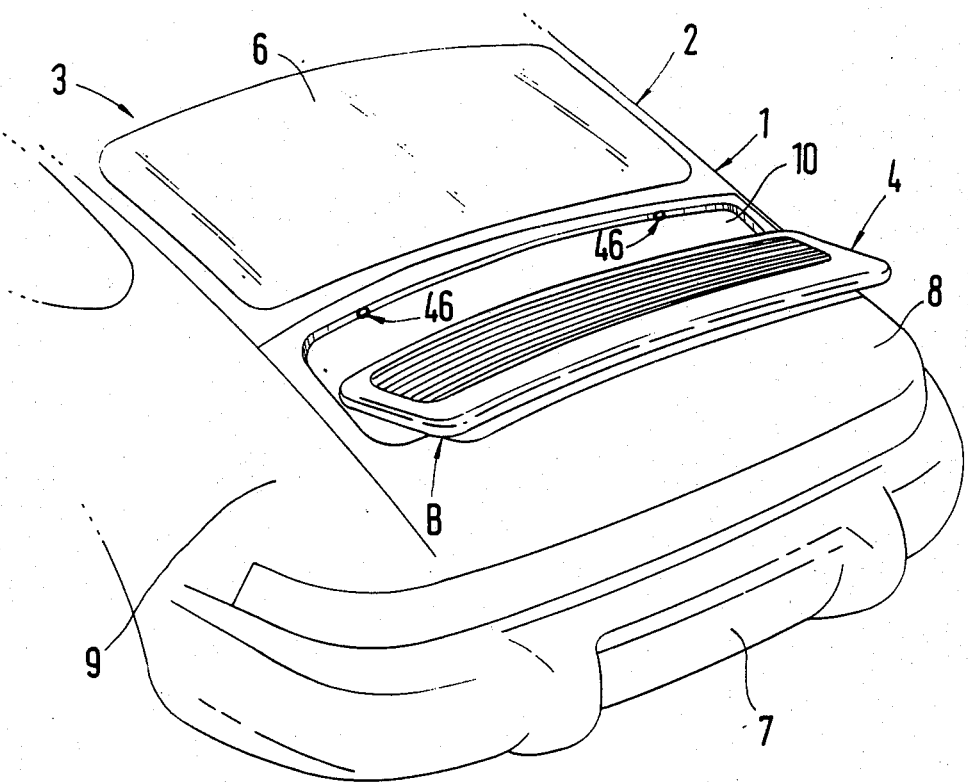
FIG. 1 is a perspective view from the rear on the rear area of a passenger motor vehicle with an adjustable air guide arrangement in accordance with the present invention.

Referring now to the drawing wherein like reference numerals are used throughout the various views to designate like parts, the passenger motor vehicle 1 includes a body 2 with an air guide arrangement 4 arranged in the rear section 3 which is displaceable by means of an adjusting mechanism 5 from a rest position A (FIG. 4) extending approximately flush with the adjoining body 2 into an extended operating position B and vice versa. On the one hand, the air resistance coefficient of the passenger motor vehicle is reduced by the air guide arrangement and, on the other, the dynamic rear wheel pressure is increased during the driving operation (downward pressure).

In the rear section 3, the body 2 is composed of a rear window 6, of a bumper 7 and of a pivotal rear lid 8 which is arranged between lateral parts 9. The rear lid 8 includes underneath the rear window 6 an approximately rectangularly shaped opening 10 into which the air guide arrangement 4 is inserted (FIG. 1). In the rest position A, the air guide arrangement 4 constructed flap-, respectively, spoiler-like extends approximately outer-surface-flush with the contour of the aerodynamically constructed rear area 3 whereas it is pivoted out of the body plane in the operating position B in such a manner that its outwardly disposed incident flow surface is positioned approximately horizontally. At the same time, the air guide arrangement 4 is displaced rearwardly opposite the driving direction C by an amount D (FIG. 3).

Figure 2:
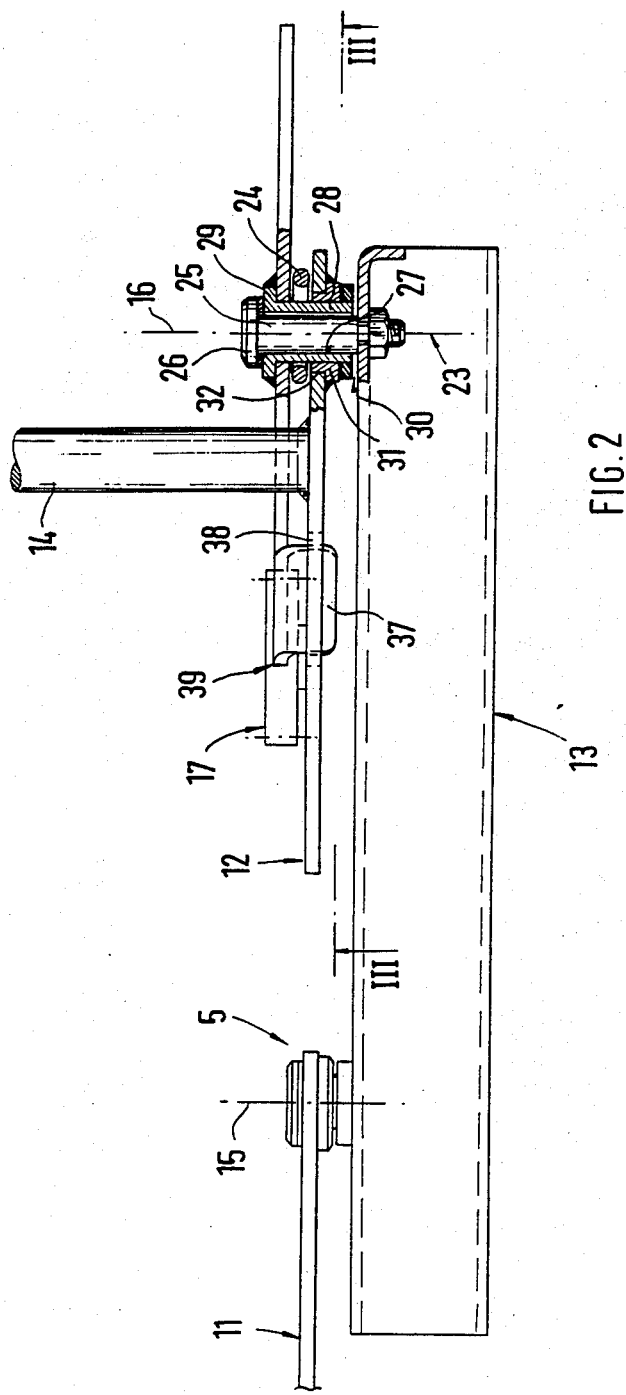
FIG. 2 is a partial plan view on the drive mechanism of the air guide arrangement in accordance with the present invention.

The adjusting mechanism 5 includes according to FIGS. 2 and 3 on each longitudinal side of the air guide arrangement 4 two adjusting levers 11 and 12 which are rotatably connected, on the one hand, with the air guide arrangement 4 and, on the other hand, with a rail 13 secured on the lid side and form a four-jointed arrangement. The points of rotation 15 and 16 of the adjusting levers 11 and 12 are thereby constructed fixed. In the extended operating position B of the air guide arrangement, the two adjusting levers 11 and 12 are designated by the reference numerals 11' and 12'.

Figure 5:
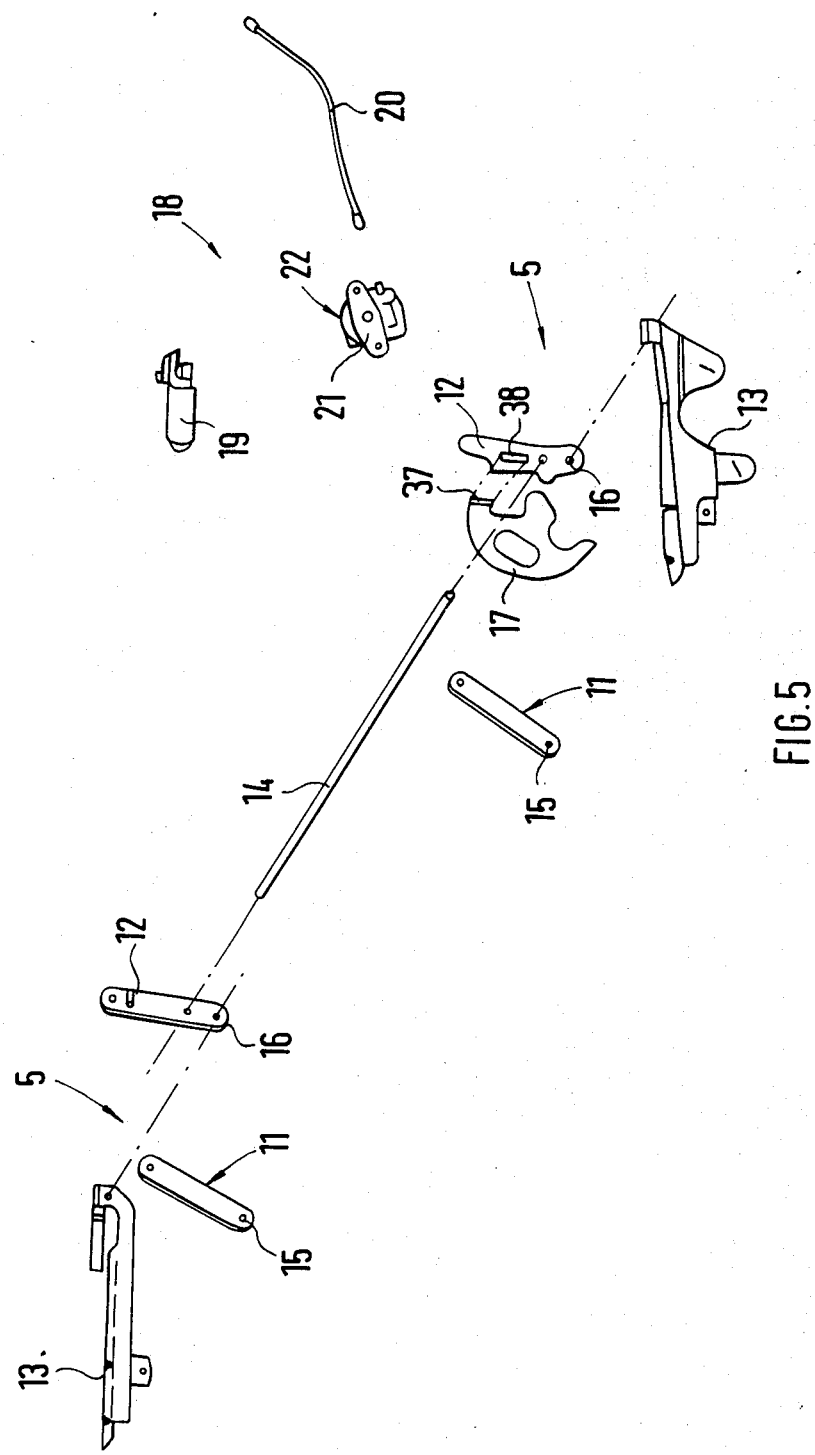
FIG. 5 is a schematic view of the drive mechanism for the air guide arrangement in accordance with the present invention.

The rearwardly disposed adjusting levers 12, as viewed in the driving direction C, are rigidly connected with each other by means of a transverse tubular member 14. The transverse tubular member 14 extends corresponding to FIG. 3 at a distance E to the point of rotation 16 of the adjusting lever 12. One of the two rearwardly disposed adjusting levers 12 cooperates with a toothed segment 17 of a drive mechanism generally designated by reference numeral 18. The drive mechanism 18 includes, according to FIG. 5, an electric motor 19 which is connected by way of a flexible shaft 20 with a drive pinion 21 of a transmission 22 whereby the drive pinion 21 arranged underneath the toothed segment 17 meshes with the toothed segment 17. The toothed segment 17 and the adjusting lever 12 are rotatably supported separately of one another about an axis 23 (FIG. 2) extending in the vehicle transverse direction and are retained in a predetermined position relative to one another by way of a spring element 24. The two adjusting levers 11 and 12 which are aligned with one another as viewed in the longitudinal direction are arranged further outwardly on the axis 23 than the toothed segment 17. The axis 23 is formed by a flange bolt 25 which at one end is screwed together with the rail 13 and which includes a head 26 at the other end.

The flange bolt 25 is surrounded by a bearing bushing 27 made of plastic material which extends between the head 26 and the rail 13. The toothed segment 17 is rigidly connected with a sleeve 28 whereby the sleeve 28 is rotatably supported on the bearing bushing 27. An end side collar 29 of the sleeve 28 is welded together with the toothed segment 17. The sleeve 28 extends to the adjoining rail 13 under formation of a gap 30. The adjusting lever 12 is also supported on the sleeve 28 by means of a bushing 31. The bushing 31 is inserted into an opening 32 of the adjusting lever 12 and is locally welded together with the same. The bearing surface of the adjusting lever 12 is enlarged by the bushing 31.

Figure 4:
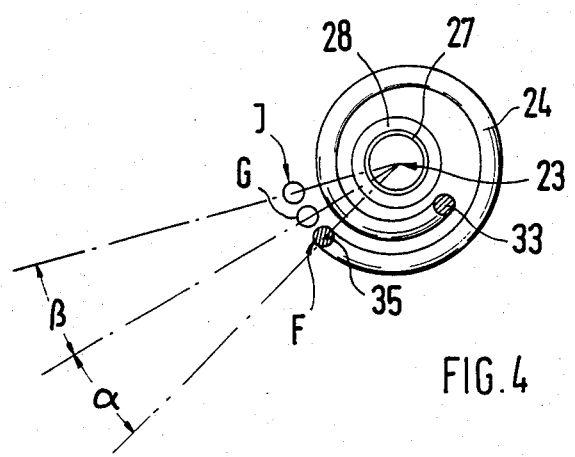
FIG. 4 is a side elevational view of the spring element of the drive mechanism in different operating positions.

The spring element 24 which is made of circular or square material is arranged between the toothed segment 17 and the adjusting lever 12, as viewed in the transverse direction, and surrounds the sleeve 28. A laterally bent-off spring end 33 protrudes into a corresponding aperture 34 of the toothed segment 17 whereas the spring end 35 bent off in the other direction engages in an aperture 36 of the adjusting lever 12 (FIG. 3). The spring element 24 is constructed spirally shaped whereby the two spring ends 33 and 35 extend offset to one another under an angle of about 90° (FIG. 4).

Furthermore, an entrainment member 37 is formed-on locally at the toothed segment 17 which with its free end bent off toward the side engages into a slot opening 38 of the adjusting lever 12. As viewed in the transverse direction, the entrainment member 37 is extended through the slot opening 38 and protrudes over the same sectionwise.

The entrainment member 37 is arranged remote from the axis 23 at the upper laterally outwardly disposed end 39 of the toothed segment 17. The slot opening 39 has an approximately constant width as viewed in its height dimension, whereby this width is somewhat greater than the width of the entrainment member 37. Furthermore, the slot opening 38 is arranged radially to the axis 23.

As viewed in the height direction, the slot opening 37 is defined by an upper boundary edge 40 and a lower boundary edge 41, whereby the two boundary edges 40 and 41 subtend an angle $\beta$ with one another. In the illustrated embodiment, the angle $\beta$ amounts to about 10 to 15°. However, the possibility exists to construct the angle $\beta$ also smaller or larger depending on the desired elasticity. The upper boundary edge 40 extends according to FIG. 3 on a straight line 42 which connects with each other the two points of rotation 16 and 43 of the adjusting lever 12. Depending on the position of the entrainment member 37, the upper boundary edge 40 can also extend above or below this straight line 42. The intersection 44 of the two straight lines 42 and 45 forming the angle $\beta$ coincides with the point of rotation 16 of the adjusting lever. The height dimension of the slot opening 38 is considerably greater than the height H of the bent-off entrainment member 37. A relative movement between the adjusting lever 12 and the toothed segment 17 is made possible by the slot opening 38, the entrainment member 37 and the spring element 24 so that during the end face of the closing operation, a defined elasticity is present in the force transmission between the toothed segment 17 and the adjusting lever 12.

During the retraction of the air guide arrangement 4, the entrainment member 37 abuts at the upper boundary edge 40 of the slot opening 38 for such length of time until the air guide arrangement runs up against the abutments 46 on the side of the body. Thereafter, the entrainment member 37 is decoupled from the upper boundary edge 40 and moves up to the lower boundary edge 41 by overcoming the spring tension. During the extension of the air guide arrangement 4, the entrainment member 37 abuts at the upper boundary edge 40 of the slot opening 38 so that a rigid force transmission between the toothed segment 17 and the adjusting lever 12 always takes place in this movement direction.

The abutments 46 arranged at the upper, respectively, lower edge of the opening 10 on the rear lid 8 are elastic but are not constructed height adjustable and have a certain oversize so that in its rest position the air guide arrangement 4 is slightly offset toward the outside with respect to the adjoining lid contour. For purposes of avoiding rattle noises, the air guide arrangement 4 always abuts at the abutment 46 under prestress.

The spring end 35 cooperating with the adjusting lever 12 assumes in the condition as delivered a position F (FIG. 4). In the installed position, which corresponds to a prestress angle $\alpha$ of about 15° of the spring element 24, the position G is coordinated to the spring element 24. During maximum load of the spring element 24, the spring end 35 is additionally pivoted through an angle $\beta$ of about 10 to 15° and the spring element 24 assumes the position J.

According to FIG. 3, two limit switches 47 and 48 are arranged at the rail 13 whereby the limit switch 47 cooperating with the adjusting lever 11 limits the extension movement of the air guide arrangement 4 whereas the other limit switch 48 is actuated by the toothed segment 17 and terminates the retraction movement of the air guide arrangement 4.

Both limit switches 47 and 48 are adjustably secured at the rail 13 and include each a switching tongue which is actuated by the adjusting lever 11, respectively, the toothed segment 17. The limit switches 47 and 48 are connected by way of lines (not shown) with the electric motor 19 and control the same.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A drive mechanism for moving an air guide means provided at a motor vehicle from a retracted rest position into an extended operating position and vice versa, comprising toothed segment means rotatably supported about an axis, said toothed segment means being operatively connected with an adjusting lever means, the toothed segment means and the adjusting lever means being supported separate of one another on the axis and being retained in a predetermined relative position relative to one another by a spring means disposed therebetween, entrainment means at said toothed segment means cooperating with a slot opening provided in the adjusting lever means in such a manner that during the extension of the air guide means into the operating position a rigid force transmission takes place between the toothed segment means and the adjusting lever means whereas during the end phase of the closing operation of the air guide means the entrainment means is decoupled from an upper boundary edge of the slot opening and moves toward a lower boundary edge of the slot opening while overcoming the spring tension of the spring means.

2. A drive mechanism according to claim 1, wherein the toothed segment means is rigidly connected with a sleeve means, and the sleeve means is rotatably supported on the axis by interposition of a bearing bushing means.

3. A drive mechanism according to claim 2, wherein said sleeve means includes a collar at one end welded together with the toothed segment means.

4. A drive mechanism according to claim 2, wherein the adjusting lever means is rotatably supported on the sleeve means.

5. A drive mechanism according to claim 1, wherein the spring means is arranged on the axis between the toothed segment means and the adjusting lever means extending at a distance thereto, a laterally bent-off spring end of said spring means engaging into an aperture of the toothed segment means and the other spring end engaging in an aperture of the adjusting lever means.

6. A drive mechanism according to claim 1, wherein the slot opening provided in the adjusting lever means is arranged radially to the axis.

7. A drive mechanism according to claim 1, wherein the slot opening, as viewed in the height direction, is defined by the upper boundary edge and the lower boundary edge, and the two boundary edges extending at an angle to one another.

8. A drive mechanism according to claim 7, wherein an intersection of the two straight lines forming said angle substantially coincides with the point of rotation of the adjusting lever means.

9. A drive mechanism according to claim 1, wherein the entrainment means is formed-on at the upper laterally outwardly disposed end of the toothed segment means.

10. A drive mechanism according to claim 1, wherein the slot opening has a slightly greater width than the entrainment means.

11. A drive mechanism with a defined elasticity according to claim 1, wherein the defined elasticity of the drive mechanism is variable by at least one of the angle of the slot opening and the design of the spring means.

12. A drive mechanism according to claim 1, wherein the air guide means abuts in its rest position against relatively fixed abutment means, and said abutment means being constructed elastic but non-adjustable.

13. A drive mechanism according to claim 4, wherein said sleeve means includes a collar at one end welded together with the toothed segment means.

14. A drive mechanism according to claim 6, wherein the slot opening, as viewed in the height direction, is defined by the upper boundary edge and the lower boundary edge, and the two boundary edges extending at an angle to one another.

15. A drive mechanism according to claim 14, wherein an intersection of the two straight lines forming said angle substantially coincides with the point of rotation of the adjusting lever means.

16. A drive mechanism according to claim 15, wherein the slot opening has a slightly greater width than the entrainment means.

17. A drive mechanism with a defined elasticity according to claim 16, wherein the defined elasticity of the drive mechanism is variable by at least one of the angle of the slot opening and the design of the spring means.

18. A drive mechanism according to claim 16, wherein the spring means is arranged on the axis between the toothed segment means and the adjusting lever means extending at a distance thereto, a laterally bent-off spring end of said spring means engaging into an aperture of the toothed segment means and the other spring end engaging in an aperture of the adjusting lever means.

19. A drive mechanism according to claim 16, wherein the slot opening provided in the adjusting lever means is arranged radially to the axis.

20. A drive mechanism according to claim 16, wherein the entrainment means is formed-on at the upper laterally outwardly disposed end of the toothed segment means.

* * * * *